United States Patent Office.

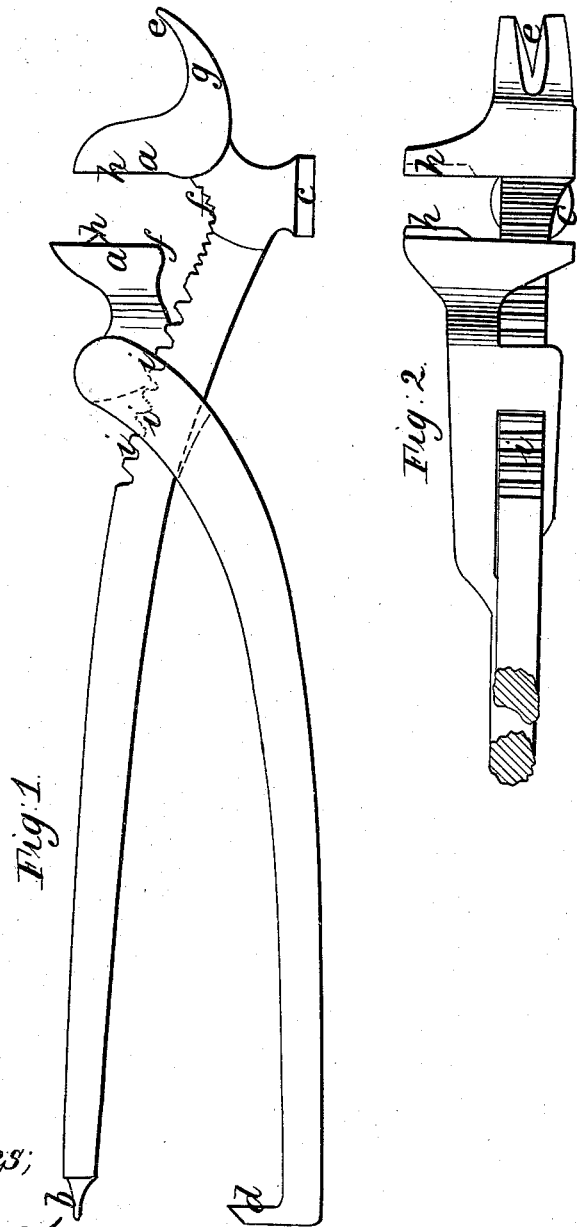

THOMAS GARRICK, OF PROVIDENCE, RHODE ISLAND.

Letters Patent No. 91,839, dated June 29, 1869.

IMPROVEMENT IN HOUSEHOLD-IMPLEMENT.

The Schedule referred to in these Letters Patent and making part of the same

To all whom it may concern:

Be it known that I, THOMAS GARRICK, of Providence, in the county of Providence, and State of Rhode Island, have invented an Improved Combination-Tongs; and do hereby declare that the following is a full and exact description, reference being had to the accompanying drawings, making part of this specification.

The nature of my invention consists in a tongs in two pieces, so shaped and arranged as to be an adjustable-jawed wrench, a screw-driver, a hammer, a scraper, a tack-puller, a nut-cracker, a stove-cover lifter, and a gas-burner tongs. I also claim a combination of teeth, or rack on one leg, with a slot on the other, for the purpose of holding the wrench or tongs-jaws at any point where they may be set.

To enable those skilled in the art to make and use my invention, I will proceed to describe its construction and operation.

Figure 1 represents a side view, and
Figure 2, a top view of the combination-tongs.
a a, adjustable jaws of wrench.
b, screw-driver.
c, hammer.
d, scraper.
e, tack-puller.
f f, nut-cracker.
g, stove-cover lifter.
h h, gas-burner tongs.
i i, rack and slot.

What I claim as my invention, and desire to secure by Letters Patent, is—

A combination adjustable wrench, nut-cracker, scraper, hammer, screw-driver, stove-cover lifter, tack-puller, and gas-burner tongs; and also the combination of a rack, or teeth upon one leg, with a slot in the other, for the purpose of holding the wrench-jaws at any point where they may be set, substantially as described.

THOMAS GARRICK.

Witnesses:
JOHN D. THURSTON,
CHAS. W. GREENE.